(12) United States Patent
Iizuka et al.

(10) Patent No.: US 12,516,975 B2
(45) Date of Patent: Jan. 6, 2026

(54) ELECTRONIC BALANCE

(71) Applicant: Shimadzu Corporation, Kyoto (JP)

(72) Inventors: Atsushi Iizuka, Kyoto (JP); Masayuki Kawai, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 548 days.

(21) Appl. No.: 17/892,131

(22) Filed: Aug. 22, 2022

(65) Prior Publication Data

US 2023/0062690 A1 Mar. 2, 2023

(30) Foreign Application Priority Data

Aug. 27, 2021 (JP) .................... 2021-139399

(51) Int. Cl.
G01G 21/28 (2006.01)
(52) U.S. Cl.
CPC .................. G01G 21/286 (2013.01)
(58) Field of Classification Search
CPC ............................................ G01G 21/286
USPC ........................................................ 177/180
See application file for complete search history.

(56) References Cited

U.S. PATENT DOCUMENTS

| 2005/0092529 | A1 | 5/2005 | Leisinger et al. | |
| 2011/0121181 | A1* | 5/2011 | Costello | H03K 17/945 29/592.1 |
| 2019/0316955 | A1 | 10/2019 | Buchmann et al. | |
| 2020/0261994 | A1* | 8/2020 | Yang | H05K 3/1216 |

FOREIGN PATENT DOCUMENTS

| CN | 1609568 | | 4/2005 | | |
| CN | 201682475 | | 12/2010 | | |
| CN | 108711566 | A * | 10/2018 | ............. | G01S 17/08 |
| JP | H11144577 | | 5/1999 | | |
| JP | 2005128015 | | 5/2005 | | |
| JP | 2005251682 | | 9/2005 | | |
| JP | 2005327894 | A * | 11/2005 | | |
| JP | 2009032571 | | 2/2009 | | |
| JP | 3207398 | | 11/2016 | | |
| JP | 2019194575 | | 11/2019 | | |
| KR | 20150018352 | A * | 2/2015 | ........... | G06F 3/0421 |
| WO | WO-2014038969 | A1 * | 3/2014 | ............. | E05F 15/632 |

OTHER PUBLICATIONS

"First Office Action of China Counterpart Application", issued on Feb. 24, 2025, with English translation thereof, pp. 1-12.

(Continued)

Primary Examiner — Peter J Macchiarolo
Assistant Examiner — Mireille S Sadate-Moualeu
(74) Attorney, Agent, or Firm — JCIPRNET

(57) ABSTRACT

An electronic balance includes: a non-contact sensor including a substrate, a light-emitting element and a light-receiving element, in which the light-emitting element is fixed to a surface of the substrate so as to be directed at a target sensing space, and the light-receiving element is fixed to the surface of the substrate, apart from the light-emitting element, so as to be directed at the target sensing space; and an operation controller configured to control an operation of a predetermined section of the electronic balance according to a detection signal from the non-contact sensor.

5 Claims, 4 Drawing Sheets

(56) References Cited

OTHER PUBLICATIONS

"Office Action of Japan Counterpart Application", issued on Aug. 27, 2024, with English translation thereof, pp. 1-6.
"Office Action of India Counterpart Application", issued on Mar. 30, 2024, p. 1-p. 6.
"Notice of Reasons for Refusal of Japan Counterpart Application", issued on Jan. 28, 2025, with English translation thereof, p. 1-p. 6.
Mettler Toredo, "Reference Manual—Analytical Balances and Comparators XPR" with Japanese Version, Aug. 2021, pp. 1-240, Available at: https://www.mt.com/dam/P5/labtec/02_Analytical_Balances/10_Excellence_Line/RM_XPR_Analytical_and_Comparators_EN.pdf.

* cited by examiner

ELECTRONIC BALANCE

CROSS REFERENCE TO RELATED APPLICATIONS

This application claims the priority benefit of Japanese Patent Application No. 2021-139399, filed on Aug. 27, 2021. The entirety of the above-mentioned patent application is hereby incorporated by reference herein and made a part of this specification.

TECHNICAL FIELD

The present invention relates to an electronic balance.

BACKGROUND ART

Electronic balances are used in laboratories or similar locations to measure the mass (weight) of a powder sample or other types of specimens. This type of electronic balance has a windshield surrounding a measuring pan in order to shield the pan from the influence of a convection or other factors in the measurement environment. This windshield is provided with a door that can be opened and closed. To perform a measurement, the user opens the door of the windshield, places a specimen on the placement surface of the measuring pan of the electronic balance, closes the door of the windshield, and reads the weighing value on a display section to obtain the weight value of the specimen.

In the past, users had to manually open and close the door of the windshield. In recent years, electronic balances capable of automatically opening and closing the door of the windshield have been commonly used. While some of those devices require users to press a physical switch for the automatic open-close operation, the automatic balances described in Patent Literature 1 and Non Patent Literature 1 employ a non-contact sensor for the open-close operation. In this type of electronic balance, a user holds his/her hand over the non-contact sensor, whereby a drive motor is activated and begins to open the door of the windshield if the door is closed at that moment, or to close the door of the windshield if the door is open at that moment. With this type of non-contact sensor, the user can perform the open-close operation by merely placing his/her hand in the vicinity of the non-contact sensor. The user does not need to place down a reagent bottle or medicinal spoon each time he/she opens or closes the door. Since the user does not need to touch a switch or similar portion of the electronic balance, the contagion of an infectious disease, such as the coronavirus disease of 2019 (COVID-19), via the electronic balance can be prevented.

The electronic balance described in Non Patent Literature employs a reflective non-contact sensor. More specifically, it employs a sensor device in which a light-emitting element (light emitting diode: LED) and a light-receiving element (photodiode: PD) are arranged next to each other in an integrated form. When the user's hand (or the like) is held in the vicinity of the sensor device in a contactless manner, a light having a specific wavelength generated from the light-emitting element is reflected or scattered by the hand (or the like). This reflected or scattered light having the specific wavelength is detected by the light-receiving element, based on which the electronic balance can sense that a hand (or the like) has been held in the vicinity of the sensor device.

Consider a situation in which the light generated from the light-emitting element has spread over an unnecessarily wide area, or the light-receiving element receives light from an unnecessarily wide area. In such a situation, even when the user's hand (or the like) is still far from the sensor device in the lateral direction, the light-receiving element may possibly detect the reflected or scattered light, causing the door of the windshield to be opened or closed contrary to the intention of the user. To deal with this problem, in the electronic balance described in Non Patent Literature 1, the light-emitting element is contained in a tubular light-emitting-element container having an aperture at one end and is positioned at an axially separated (deep) position from the aperture, while the light-receiving element is also similarly contained in a tubular light-receiving-element container and is positioned at an axially separated (deep) position from the aperture. The light-emitting-element container and the light-receiving-element container are obliquely fixed relative to each other so that their respective axes intersect with each other within a target sensing space. Positioning the light-emitting element at a deep position from the aperture of the light-emitting-element container reduces the spread of the emitted light, while positioning the light-receiving element at a deep position from the aperture of the light-receiving-element container limits the spatial area from which the light enters the light-receiving element. Thus, the user's hand (or the like) is prevented from being sensed by the sensor device over an unnecessarily wide area, so that the door of the windshield is prevented from being opened and closed against the intention of the user. In addition, in order to align the emitting direction of the light-emitting element with the direction of the aperture of the light-emitting-element container, the light-emitting-element container itself needs to be capable of securely holding the light-emitting element, which means that the light-emitting-element container becomes undesirably large in size in order to satisfactorily hold the light-emitting element.

CITATION LIST

Patent Literature

Patent Literature 1: JP 2019-194575 A

Non Patent Literature

Non Patent Literature 1: "Reference Manual—Analytical Balances and Comparators XPR", [online], issue date unknown, METTLER TOREDO, [accessed on Aug. 11, 2021], the Internet

SUMMARY OF INVENTION

Technical Problem

In many electronic balances, in order to improve their operability for analysis operators, a plate-shaped operation panel unit containing switches for the switching of the display contents and other operations is provided along with a display device for showing a measured weight and other items of information, and this operation panel unit is located in front of the measuring pan and the windshield as well as at a low level so that the unit will not hide the measuring pan from the user's view. The non-contact sensor for opening and closing the door should preferably be provided in this operation panel unit since it is reasonable for the sensing space of the non-contact sensor to be located above (or above front of) the top surface of the operation panel unit. Applying this design to the tubular containers of the light-emitting and light-receiving elements of the electronic balance described in Non Patent Literature 1 requires those containers to be vertically positioned, which means that the non-contact sensor requires a considerable height, and the operation panel unit containing the sensor must also become considerably large in thickness.

The problem to be solved by the present invention is to provide an electronic balance which can reduce the size of the space required for the installation of a non-contact sensor.

Solution to Problem

The electronic balance according to the present invention developed for solving the previously described problem includes:
a non-contact sensor, including a substrate, a light-emitting element and a light-receiving element, wherein the light-emitting element is fixed to a surface of the substrate so as to be directed at a target sensing space, and the light-receiving element is fixed to the surface of the substrate, apart from the light-emitting element, so as to be directed at the target sensing space; and
an operation controller, configured to control an operation of a predetermined section of the electronic balance according to a detection signal from the non-contact sensor.

In the electronic balance according to the present invention, since both the light-emitting element and the light-receiving element have directionality, it is unnecessary to employ tubular members for limiting the spatial area of the emission of light and that of the reception of light. This allows the non-contact sensor to be smaller in height. Therefore, the non-contact sensor can be contained in an operation panel unit located in front of and at a lower level than the measuring pan and the windshield, without increasing the thickness of the operation panel unit.

Advantageous Effects of Invention

The electronic balance according to the present invention can reduce the size of the space required for the installation of a non-contact sensor.

DESCRIPTION OF EMBODIMENTS

Figure 1:
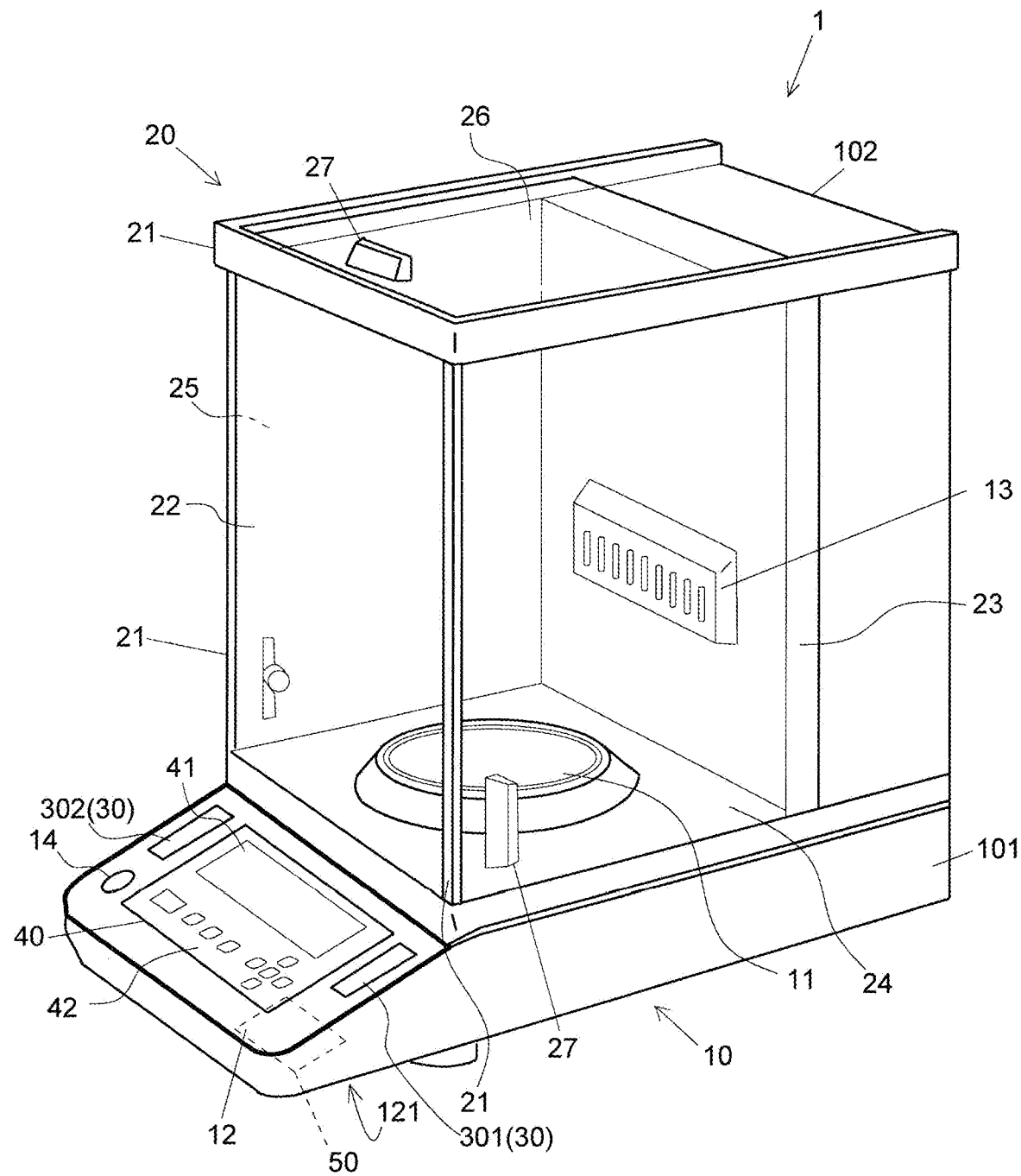
FIG. 1 is a perspective view showing one embodiment of the electronic balance according to the present invention.
Figure 2:
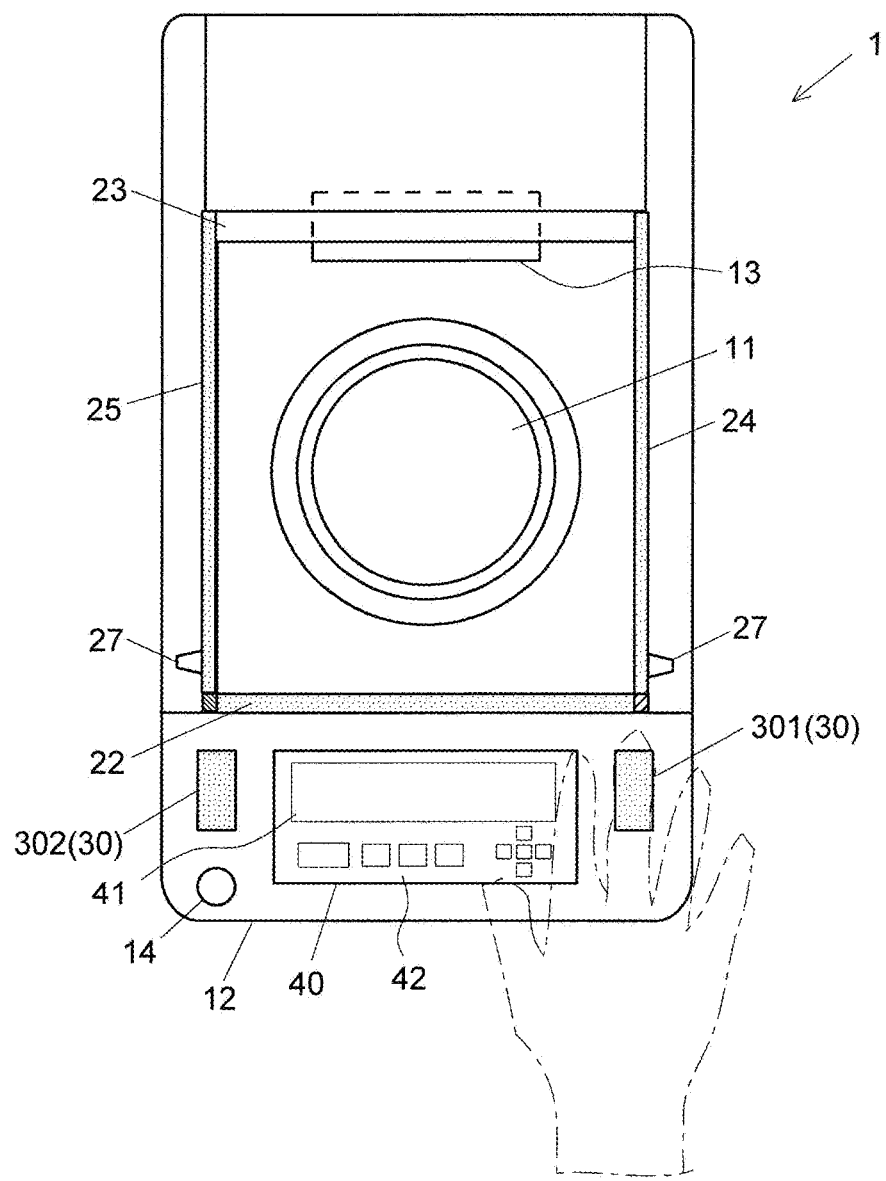
FIG. 2 is a top view showing the electronic balance according to the present embodiment.

An embodiment of the electronic balance according to the present invention is hereinafter described using FIGS. 1-6. As shown in FIG. 1, the electronic balance 1 according to the present embodiment includes: an electronic-balance main body 10 having a base 101 and a rear wall body 102; a measuring pan 11, located on the top surface of the base 101, on which a specimen is to be placed; an operation panel unit 12; and a windshield 20 surrounding the measuring pan 11. The space surrounded by the windshield 20 forms the measuring chamber. The weight of the specimen placed on the measuring pan 11 is measured by a weighing mechanism (not shown) located within the base 101.

The windshield 20 includes: a front wall 22; a back wall 23; a frame 21 which holds the front wall 22 and connects the front wall 22 and the back wall 23 between their upper ends; as well as a right door 24, left door 25 and upper door 26 which are held by the frame 21 so that they can be opened and closed. The front wall 22, right door 24, left door 25 and upper door 26 are made of a transparent material, such as glass. Each of the right, left and upper doors 24, 25 and 26 can be automatically opened and closed by a door open-close mechanism (not shown) which includes a drive motor contained in the rear wall body 102 as a drive source, in response to specific operational actions (which will be described later) performed by a user. Each door is provided with a grip 27, which allows the user to manually open and close the door by holding the grip 27. A static eliminator 13 for removing the static electricity within the measuring chamber is provided on the back wall 23.

The operation panel unit 12 is located in front of the windshield 20 and at a low level so that it does not hide the measuring pan 11 from the user's view. The operation panel unit 12 has a power switch 14, input/display section (operation panel) 40, and two non-contact sensors (right non-contact sensor 301 and left non-contact sensor 302). The input/display section 40 consists of a liquid crystal panel and a touch pad combined together. This section includes a display area 41 in which measured values and setting items are to be displayed, and an operation area 42 in which images that represent operation keys and buttons are to be displayed. The operation panel unit 12 also contains an operation controller 50 configured to control the open-close operation of the right, left and upper doors 24, 25 and 26 according to the detection signals from the right and left non-contact sensors 301 and 302. The operation controller 50 is embodied by the combination of a hardware system (including a CPU) and a software program for operating the hardware system.

The right and left non-contact sensors 301 and 302 are arranged on the right and left sides of the input/display section 40, respectively. When an object (such as the user's hand) is placed in the vicinity of one of the two sensors as indicated by the imaginary line in FIG. 2, the sensor senses that object in a contactless manner. The right non-contact sensor 301 and the left non-contact sensor 302 are identical in configuration. The right and left non-contact sensors 301 and 302 are hereinafter collectively called the "non-contact sensor 30".

Figure 3:
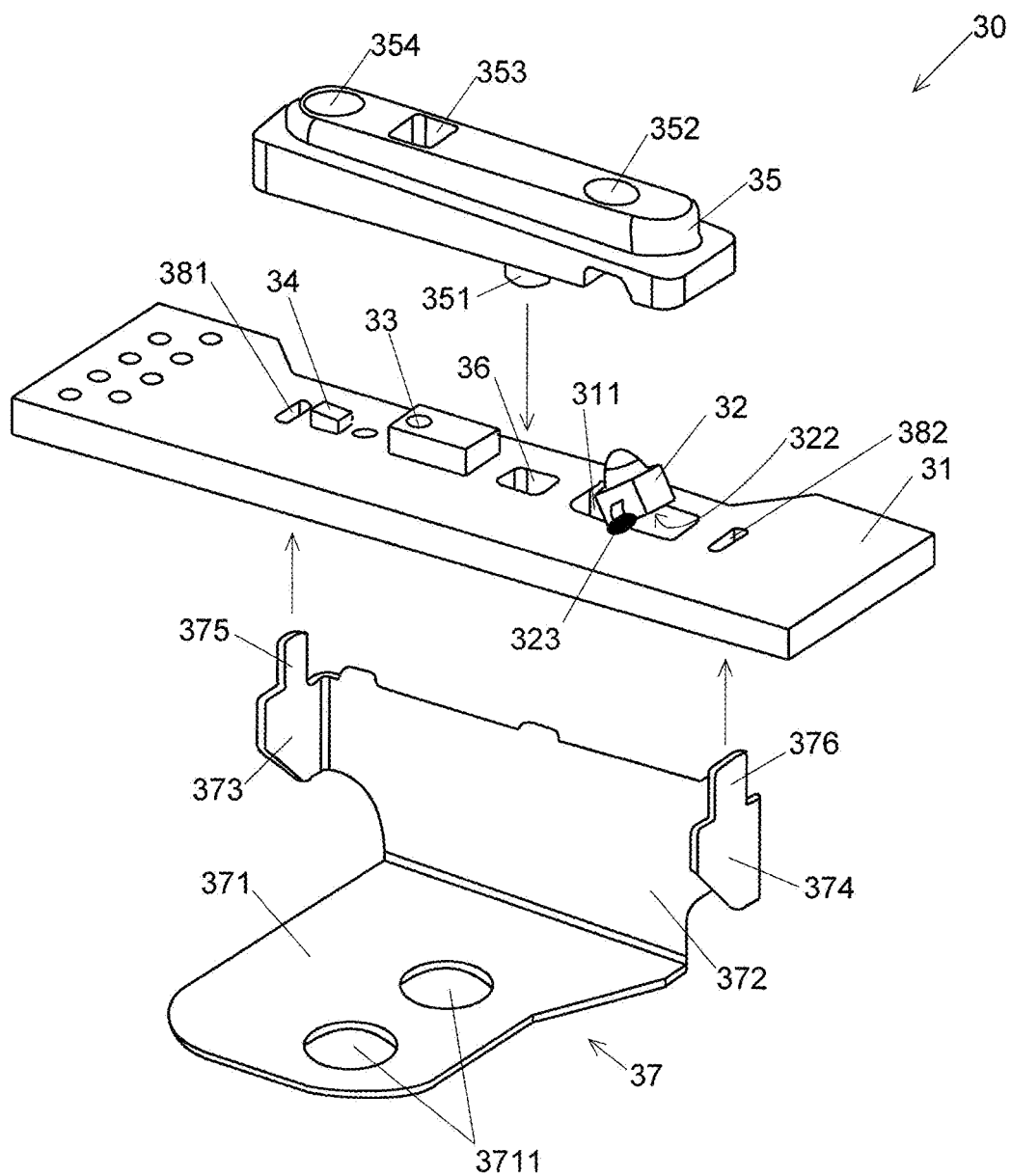
FIG. 3 is an exploded perspective view of the non-contact sensor in the electronic balance according to the present embodiment.
Figure 4:
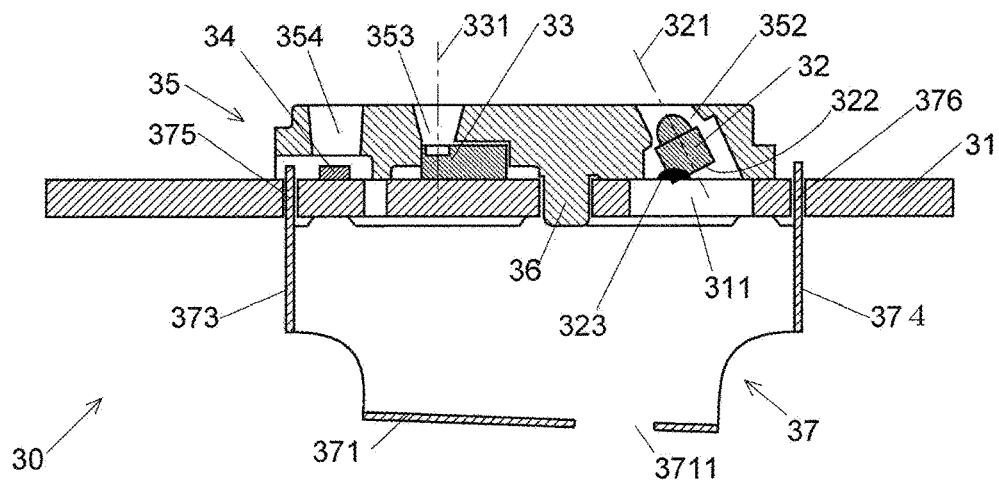
FIG. 4 is a sectional view of the non-contact sensor in the electronic balance according to the present embodiment.

As shown in the perspective view in FIG. 3 (in which the sensor is separated into three parts for ease of comprehension) and the sectional view in FIG. 4, the non-contact sensor 30 includes a substrate 31 as well as a light-emitting element 32, light-receiving element 33 and other related elements fixed to the surface of the substrate 31 at positions separate from each other (the other components of the non-contact sensor 30 will be described later). The light-emitting element 32 is a device which emits infrared radiation having a specific range of wavelengths. The light-receiving element 33 is a device which senses infrared radiation within the same range of wavelengths.

The device used as the light-emitting element 32 is an LED package including an LED encapsulated with a resin material shaped into a lens. Since the encapsulating resin has a lens-like form, the light generated from the LED and emitted through the encapsulating resin to the outside of the LED package is with directionality. The device used as the light-receiving element 33 is a photodiode (PD) configured to detect light with directionality. These types of LEDs and PDs are produced by many manufacturers (some of which produce multiple kinds of these devices). The manufacturers normally disclose data concerning the directionality of those LED packages and PDs. Referring to those data, for example, an LED package (or PD) can be selected which emits (or receives) light in such a manner that the intensity of the emitted (or received) light at an angle of 60 degrees from the angle at which the emitted (or received) light has the maximum intensity is less than one half of the maximum intensity. The angle at which the intensity of light decreases to one half of the maximum intensity should preferably be equal to or smaller than 45 degrees, and more preferably, equal to or smaller than 30 degrees.

Both the light-emitting element 32 and the light-receiving element 33 are fixed to the substrate 31 so that they are directed at the same target sensing space. Specifically, the directions of these two elements are individually adjusted so that an axis that extends in the direction in which the light-emitting element 32 has the maximum light-emitting intensity (see FIG. 4; this axis is hereinafter called the "maximum light-emitting intensity axis 321") and an axis that extends in the direction in which the light-receiving element 33 has the maximum light-receiving intensity (see FIG. 4; this axis is hereinafter called the "maximum light-receiving intensity axis 331") intersect with each other within a space above the substrate 31 (i.e., a right area of the space above the operation panel unit 12 for the right non-contact sensor 301, or a left area of the space above the operation panel unit 12 for the left non-contact sensor 302).

Figure 5:
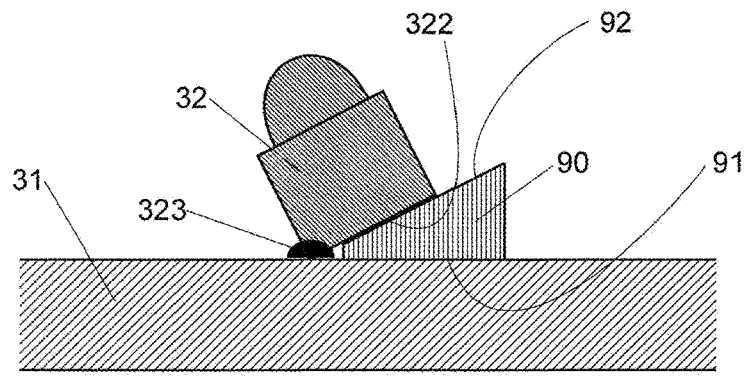
FIG. 5 is a sectional view showing a situation in the process of fixing a light-emitting element to a substrate.

The light-emitting element 32 has a rectangular bottom surface 322 perpendicular to the maximum light-emitting intensity axis 321. This bottom surface 322 is fixed to the surface of the substrate 31 by solder 323 at two points in the vicinity of the two ends of one side of the rectangle, with the bottom surface 322 inclined to the surface of the substrate 31 so that the light-emitting element 32 is directed at the aforementioned space. A hole 311 is formed in the surface of the substrate 31 between the two points where the solder 323 which fixes the light-emitting element 32 is adhered, in order to avoid interference between a portion of the bottom surface of the light-emitting element 32 and the surface of the substrate 31 when the light-emitting element 32 is obliquely arranged with respect to the surface of the substrate 31. When the electronic balance according to the present embodiment is manufactured, as shown in FIG. 5, a jig 90 having an inclined surface 92 whose angle of inclination to the bottom surface 91 is equal to the angle by which the light-emitting element 32 should be tilted is placed on the surface of the substrate 31, and the soldering work is performed while the bottom surface 322 of the light-emitting element 32 is maintained in contact with the inclined surface 92 of the jig 90.

On the other hand, the light-receiving element 33 is fixed to the surface of the substrate 31 so that its bottom surface, which is perpendicular to the maximum light-receiving intensity axis 311, is entirely in contact with the surface of the substrate 31. It should be noted that the light-receiving element 33 may have its bottom surface obliquely fixed to the surface of the substrate 31 in addition to or in place of the light-emitting element 32. In the case of obliquely fixing the light-receiving element 33 to the substrate 31 in this manner, it is unnecessary to use the below described element cover 35 for the fixation of the light-receiving element 33. This realizes a size reduction of the element cover 35.

Also provided on the surface of the substrate 31 is a visible light source 34, which is an indicator that turns on when the non-contact sensor 30 is active. It should be noted that the electronic balance 1 allows the user to perform a predetermined operation with the operation keys on the input/display section 40 to disable the non-contact sensor 30 even when the electronic balance 1 is in operation so that the door will not be unintentionally opened or closed when, for example, the user's hand has accidentally come into the vicinity of the non-contact sensor 30. When the non-contact sensor 30 is disabled, the visible light source 34 turns off to indicate that the non-contact sensor 30 is disabled.

The element cover 35 is placed over the substrate 31 and the elements fixed to the substrate 31. The element cover 35 has a projection 351 on its bottom surface, while the substrate 31 has a projection fit-in hole 36 corresponding to the projection 351. The element cover 35 is attached to the substrate 31 by fitting the projection 351 into the projection fit-in hole 36. Three apertures are formed in the element cover 35: a light-emitting aperture 352 located above the light-emitting element 32, with the axis of the aperture obliquely extending to the substrate 31 so as to coincide with the angle of the maximum light-emitting intensity axis 321; a light-receiving aperture 353 located above the light-receiving element 33, with the axis of the aperture perpendicularly extending to the substrate 31 so as to coincide with the angle of the maximum light-receiving intensity axis 331; and a visible light aperture 354 located above the visible light source 34 and perpendicularly formed to the substrate 31. The element cover 35 is made of a material which barely causes the diffuse reflection of the infrared radiation on the surface of the element cover 35 within the wavelength range of the radiation emitted from the light-emitting element 342 and received by the light-receiving element 35. A black plastic material is used in the present embodiment while rubber may also be used in place of the plastic. Only the surface layer of the element cover 35 may be made of a material having the aforementioned property or be processed to gain the aforementioned property.

As noted earlier, the light-emitting element 32 emits light with directionality. However, the emission still contains rays of light which are inclined to the maximum light-emitting intensity axis 321 to a certain extent. A portion of those rays of light which travel in the inclined directions to the maximum light-emitting intensity axis 321 will hit the inner wall of the light-emitting aperture 352 and be prevented from exiting the element cover 35. Similarly, a portion of the light travelling in the directions inclined to the maximum light-receiving intensity axis 331 will hit the inner wall of the light-receiving aperture 353 and be prevented from being detected by the light-receiving element 33. However, due to the use of the light-emitting and light-receiving elements 32 and 33 that emit and receive light with directionality, the electronic balance according to the present embodiment allows the thickness of the element cover 35 to be smaller than the height of the tubular light-emitting-element container and the tubular light-receiving-element container used in the electronic balance described in Non Patent Literature 1, while being comparable to or even higher than the electronic balance described in Non Patent Literature 1 in terms of the ability to suppress the spread of the emitted light and that of the received light, thereby preventing the user's hand (or the like) from being sensed over an unnecessarily wide area.

Furthermore, the element cover 35 may be omitted in the present embodiment. The omission of the element cover 35 makes the non-contact sensor 30 (exclusive of the substrate fixture 37, which will be described later) even thinner. A cover configured to enclose only one of the light-emitting and light-receiving elements 32 and 33 may also be used.

The substrate fixture 37 is provided below the substrate 31 in order to fix the substrate 31 to the casing of the operation panel unit 12. The substrate fixture 37 is a part having a predetermined shape stamped from a plate material and bent at predetermined lines. It has the following portions: a casing contact portion 371 configured to come in contact with the upper surface of a lower casing wall 121 forming the bottom side of the casing of the operation panel unit 12; a central vertical portion 372 which is a bent portion vertically extending from the casing contact portion 371; a left vertical portion 373 and a right vertical portion 374 formed by bending the right and left ends of the central vertical portion 372 by 90 degrees at bending lines which extend in an approximately vertical direction (as will be described later); as well as a left projecting portion 375 and a right projecting portion 376 projecting upward from the left and right vertical portions 373 and 374, respectively. The casing contact portion 371 has holes 3711 through which the bolts 391 for fixing the casing contact portion 371 to the lower casing wall 121 are to be inserted. The substrate 31 has a left fit-in hole 381 and a right fit-in hole 382 into which the left and right projecting portions 375 and 376 of the substrate fixture 37 are to be fitted, respectively.

Figure 6:
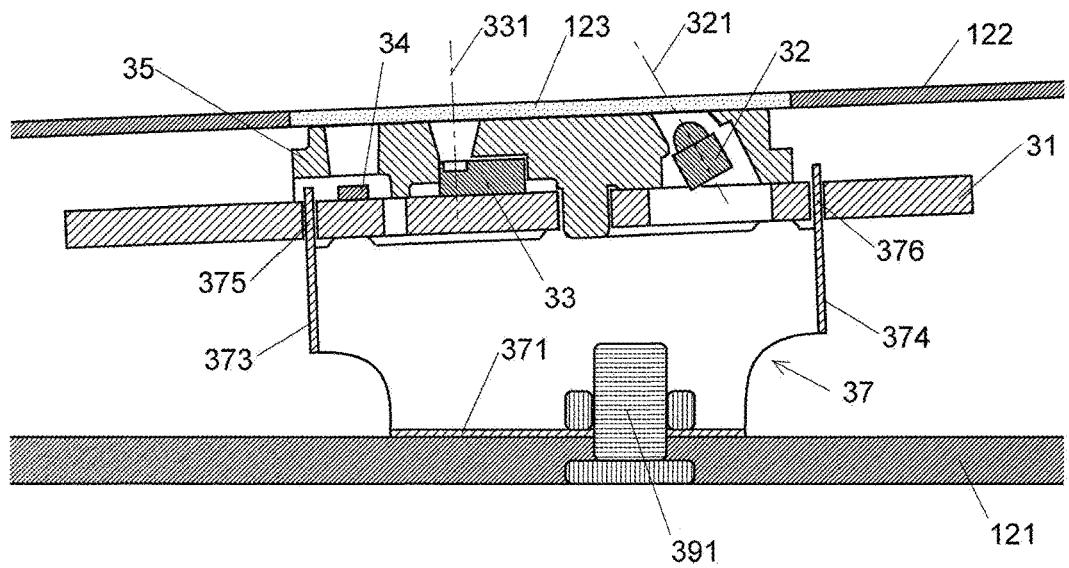
FIG. 6 is a sectional view showing the non-contact sensor fixed to the inside of the casing of an operation panel unit.

When the casing contact portion 371 is placed so that its plate surface is in contact with the upper surface of the lower casing wall 121, the plate surface of the central vertical portion 372 is perpendicular to the upper surface of the lower casing wall 121, whereas the bending line between the left vertical portion 373 and the central vertical portion 372 as well as the bending line between the right vertical portion 374 and the central vertical portion 372 are slightly tilted, extending from upper left to lower right, so that the upper end of the left vertical portion 373 is slightly lower than that of the right vertical portion 374. Therefore, the left projecting portion 375 is also slightly lower than the right projection portion 376. Consequently, after the substrate 31 has been fixed to the substrate fixture 37 by fitting the left projecting portion 375 into the left fit-in hole 381 of the substrate 31 and the right projecting portion 376 into the right fit-in hole 382 of the substrate 31, when the casing contact portion 371 is fixed to the upper surface of the lower casing wall 121 with the bolts 391 and other related parts, the substrate 31 is inclined to the lower casing wall 121, with the side of the left fit-in hole 381 being slightly lower than that of the right fit-in hole 382 (FIG. 6).

When the non-contact sensor 30 is thus fixed to the lower casing wall 121 and contained in the operation panel unit 12, the substrate 31 and the upper casing wall 122 of the operation panel unit 12 are approximately parallel to each other, both being inclined to the lower casing wall 121 by approximately equal angles. Since the upper casing wall 122 is inclined in this manner, the user working at the desk and directly facing the electronic balance 1 placed on the desk can sit in a natural position to view the display area 41, perform an operational action against the non-contact sensor 30, or operate the operation keys (or the likes) in the operation area 42.

On the upper surface of the element cover 35 of the non-contact sensor 30, an infrared-passing window 123 fitted in the upper casing wall 122 is located.

A space corresponding to the height of the central vertical portion 372 is formed between the lower casing wall 121 and the substrate 31 of the non-contact sensor 30 within the operation panel unit 12. This space can be used to contain the operation controller 50, devices for controlling the input/display section 40 and other related components.

The operations of the electronic balance 1 according to the present embodiment are similar to those of a common type of electronic balance except for the open-close operation of the door of the windshield 20. The following description deals with the open-close operation of the door of the windshield 20. As noted earlier, the electronic balance 1 according to the present embodiment can automatically open and close the right door 24, left door 25 and upper door 26.

If the user holds his/her hand (or the like) over the right non-contact sensor 301 when the right door 24 is closed, the right non-contact sensor 301 produces a detection signal. Upon receiving this signal, the operation controller 50 controls the drive motor for the right door 24, whereby the right door 24 is opened. If the user holds his/her hand (or the like) over the right non-contact sensor 301 when the right door 24 is open, the right non-contact sensor 301 produces a detection signal. Upon receiving this signal, the operation controller 50 controls the drive motor for the right door 24, whereby the right door 24 is closed.

If the user holds his/her hand (or the like) over the left non-contact sensor 302 when the left door 25 is closed (or opened), the left non-contact sensor 302 produces a detection signal. Upon receiving this signal, the operation controller 50 controls the drive motor for the left door 25, whereby the left door 25 is opened (or closed).

If the user simultaneously holds his/her hands (or the likes) over the right and left non-contact sensors 301 and 302 for a short period of time (e.g., shorter than three seconds) and quickly removes their hands (or the likes), the right and left non-contact sensors 301 and 302 produce detection signals for that short period of time. Upon receiving these detection signals, the operation controller 50 controls the drive motors for the right and left doors 24 and 25, whereby the right and left doors 24 and 25 are simultaneously opened (if these doors have been closed until then) or closed (if these doors have been opened until then).

If the user simultaneously holds his/her hands (or the likes) over the right and left non-contact sensors 301 and 302 for a comparatively long period of time (e.g., equal to or longer than three seconds) when the upper door 26 is closed (or open), the right and left non-contact sensors 301 and 302 produce detection signals for that long period of time. Upon receiving these detection signals, the operation controller 50 controls the drive motor for the upper door 26, whereby the upper door 26 is opened (or closed).

In the electronic balance 1 according to the present embodiment, since both the light-emitting element 32 and the light-receiving element 33 have directionality, it is unnecessary to employ tubular members for limiting the spatial area of the emission of light and that of the reception of light. This allows the non-contact sensor 30 to be smaller in height. Therefore, the non-contact sensor 30 can be contained in an operation panel unit 12 located in front of and at a lower level than the measuring pan 11 and the windshield 20, without increasing the thickness of the operation panel unit 12.

The present invention is not limited to the previously described embodiment. It may be changed or modified in various forms within the gist of the present invention. Some modified examples have already been appropriately presented in the descriptions of the previous embodiment.

There are also other possible variations. For example, although the non-contact sensor 30 in the previous embodiment is used for the open-close operation of the door of the windshield 20, the same non-contact sensor 30 may alternatively be used for other purposes. For example, it may be used as a switch for changing the items displayed on the input/display section (operation panel) 40 or a switch for setting the zero point (i.e., operating this switch resets the displayed weight to zero).

Modes

A person skilled in the art can understand that the previously described illustrative embodiment is a specific example of the following modes of the present invention.
(Clause 1)
  An electronic balance according to Clause 1 includes:
    a non-contact sensor, including a substrate, a light-emitting element and a light-receiving element, wherein the light-emitting element is fixed to a surface of the substrate so as to be directed at a target sensing space, and the light-receiving element is fixed to the surface of the substrate, apart from the light-emitting element, so as to be directed at the target sensing space; and
    an operation controller, configured to control an operation of a predetermined section of the electronic balance according to a detection signal from the non-contact sensor.
  In the electronic balance according to Clause 1, since both the light-emitting element and the light-receiving element have directionality, it is unnecessary to employ tubular members for limiting the spatial area of the emission of light and that of the reception of light. This allows the non-contact sensor to be smaller in height.
(Clause 2)
  The electronic balance according to Clause 2, which is one mode of the electronic balance according to Clause 1, further includes: an element cover, having a hole or holes configured to contain the light-emitting element and/or the light-receiving element, wherein the hole or holes extend in the direction in which the light-emitting element and/or the light-receiving element is directed and are open at the upper end of the element cover.
  In the electronic balance according to Clause 2, the light-emitting element and the light-receiving element do not only have directionality, but one or both of these two elements are contained in a hole or holes formed in the element cover, where the hole or holes extend in the direction in which the light-emitting or light-receiving element is directed and are open at their upper ends. Therefore, the spatial area of the light emitted from the light-emitting element and/or that of the light received by the light-receiving element is even more reduced, so that the non-contact sensor is less likely to accidentally sense the user's hand (or the like) against the intention of the user. Since not only the hole or holes of the element cover but also the light-emitting element and the light-receiving element have directionality, it is possible to suppress the occurrence of an unintended sensing of an object to a comparable or even higher degree while making the entire non-contact sensor thinner than in the conventional case in which tubular containers are used for the light-emitting and light-receiving elements.
(Clause 3)
  In the electronic balance according to Clause 3, which is one mode of the electronic balance according to Clause 1 or 2, the non-contact sensor is contained in an operation panel unit located in front of and at a lower level than a measuring pan.
  In the electronic balance according to Clause 3, since the height of the non-contact sensor is reduced, the non-contact sensor can be contained in the operational panel unit located in front of and at a lower level than the measuring pan, without increasing the thickness of the operation panel unit.
(Clause 4)
  The electronic balance according to Clause 4, which is one mode of the electronic balance according to one of Clauses 1-3, further includes: a windshield, surrounding a measuring pan; a door, attached to the windshield; and a drive source, configured for opening and closing the door. The operation controller is configured to control the drive source according to the detection signal from the non-contact sensor.
  The electronic balance according to Clause 4 allows the user to open and close the door of the windshield without touching the same door, by performing an operational action against the non-contact sensor.
(Clause 5)
  The electronic balance according to Clause 5, which is one mode of the electronic balance according to Clause 1, the light-emitting element or the light-receiving element is fixed to the surface of the substrate by solder.

The invention claimed is:
1. An electronic balance, comprising:
  a non-contact sensor, including a substrate, a light-emitting element and a light-receiving element, wherein the light-emitting element is fixed to a surface of the substrate so as to be directed at a target sensing space, and the light-receiving element is fixed to the surface of the substrate, apart from the light-emitting element, so as to be directed at the target sensing space, and at least one of maximum light-emitting intensity axis of the light-emitting element and maximum light-receiving intensity axis of the light-receiving element is inclined at an angle other than 90 degrees with respect to the surface of the substrate; and
  an operation controller, configured to control an operation of a predetermined section of the electronic balance according to a detection signal from the non-contact sensor,
  wherein
  the light-emitting element is configured to emit light in such a manner that an intensity of the emitted light at an angle of 60 degrees from an angle at which the emitted light has a maximum intensity is less than one half of the maximum intensity, and
  the light-receiving element is configured to receive light in such a manner that an intensity of the received light at an angle of 60 degrees from the angle at which the received light has a maximum intensity is less than one half of the maximum intensity.
2. The electronic balance according to claim 1, further comprising:
  an element cover, having a hole or holes configured to contain the light-emitting element and/or the light-receiving element,
  wherein the hole or holes extend at an angle that is a same as the maximum light-emitting intensity axis of the light-emitting element and/or the maximum light-receiving intensity axis of the light-receiving element relative to the surface of the substrate.

3. The electronic balance according to claim 1, wherein the non-contact sensor is contained in an operation panel unit located in front of and at a lower level than a measuring pan.

4. The electronic balance according to claim 1, further comprising:
   a windshield, surrounding a measuring pan;
   a door, attached to the windshield; and
   a drive source, configured for opening and closing the door,
   wherein the operation controller is configured to control the drive source according to the detection signal from the non-contact sensor.

5. The electronic balance according to claim 1, wherein the light-emitting element or the light-receiving element is fixed to the surface of the substrate by solder.

\* \* \* \* \*